United States Patent
Camp, Jr. et al.

(10) Patent No.: US 8,099,108 B2
(45) Date of Patent: Jan. 17, 2012

(54) MOBILE TERMINALS INCLUDING DISPLAY SCREENS CAPABLE OF DISPLAYING MAPS AND MAP DISPLAY METHODS FOR MOBILE TERMINALS

(75) Inventors: William O. Camp, Jr., Chapel Hill, NC (US); Yojak Vasa, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 900 days.

(21) Appl. No.: 11/776,805

(22) Filed: Jul. 12, 2007

(65) Prior Publication Data

US 2009/0017840 A1    Jan. 15, 2009

(51) Int. Cl.
H04W 24/00    (2009.01)

(52) U.S. Cl. ..................... 455/456.3; 455/566

(58) Field of Classification Search .................. 455/456, 455/433, 457, 461, 517; 701/117, 202, 208, 701/209; 340/990
See application file for complete search history.

(56) References Cited

U.S. PATENT DOCUMENTS

| | | | |
|---|---|---|---|
| 2002/0087263 A1 | 7/2002 | Wiener | |
| 2002/0116121 A1* | 8/2002 | Ruiz et al. | 701/208 |
| 2003/0201912 A1* | 10/2003 | Hashida et al. | 340/995.12 |
| 2004/0193371 A1 | 9/2004 | Koshiji et al. | |
| 2005/0195221 A1* | 9/2005 | Berger et al. | 345/660 |
| 2006/0122768 A1* | 6/2006 | Sumizawa et al. | 701/208 |
| 2007/0124065 A1* | 5/2007 | Ho et al. | 701/208 |
| 2008/0243375 A1* | 10/2008 | Han | 701/208 |
| 2008/0288166 A1* | 11/2008 | Onishi et al. | 701/209 |

FOREIGN PATENT DOCUMENTS

| | | |
|---|---|---|
| DE | 195 37 255 A1 | 4/1996 |
| DE | 19537255 A1 | 4/1996 |
| JP | 08-145699 A | 6/1996 |
| JP | 08-286602 A | 11/1996 |
| JP | 10-013961 A | 1/1998 |
| JP | 10 105053 A | 4/1998 |
| JP | 10105053 | 4/1998 |
| JP | 2001-117554 A | 4/2001 |
| JP | 2002-213990 A | 7/2002 |
| JP | 2002-312801 A | 10/2002 |

OTHER PUBLICATIONS

Invitation to Pay Additional Fees for corresponding PCT application PCT/US2008/01976 dated Jul. 7, 2008.
International Search Report and Written Opinion (16 pages) corresponding to International Patent Application No. PCT/US2008/001976; Mailing Date: Sep. 12, 2008.

* cited by examiner

*Primary Examiner* — Nick Corsaro
*Assistant Examiner* — Mahendra Patel
(74) *Attorney, Agent, or Firm* — Myers Bigel Sibley & Sajovec

(57) ABSTRACT

A mobile terminal includes a communication module, a display screen, and control circuitry. The circuitry is configured to estimate a current geographic position of the mobile terminal, and to determine if the estimated current position of the mobile terminal is within a boundary of geographic map information stored in the mobile terminal. The circuitry is further configured to retrieve additional geographic map information including the current position of the mobile terminal using the communication module if the current position of the mobile terminal is not within the boundary of the stored geographic map information.

19 Claims, 11 Drawing Sheets

MOBILE TERMINALS INCLUDING DISPLAY SCREENS CAPABLE OF DISPLAYING MAPS AND MAP DISPLAY METHODS FOR MOBILE TERMINALS

FIELD OF THE INVENTION

The present invention relates to wireless communication terminals, and more particularly, to wireless communication terminals including display screens capable of displaying map information.

BACKGROUND

Wireless communication terminals are primarily used for obtaining access to wireless telephone services through a cellular telephone network. However, as the capabilities of wireless communication terminals increase, an additional level of user functionality is being included in the hardware and/or software of such terminals. For example, a communication terminal may be provided with a still and/or video camera, allowing pictures and/or videos to be taken by a user and transmitted from the mobile terminal to others. Likewise, many communication terminals include personal digital assistant (PDA) type applications suitable for tracking and managing schedules, tasks and the like. Many communication terminals also include messaging capability, such as electronic mail (e-mail), short message service (SMS) and multimedia message service (MMS) capabilities. Communication terminals may also be capable of connecting to the internet by using internet protocol (IP) over wireless and/or wired networks.

Communication terminals are also increasingly being provided with the capability of determining the physical location of the terminal. For example, many communication terminals include global positioning system (GPS) receivers that permit the terminals to determine their location with a high degree of precision. Other systems for determining the location of a communication terminal have been implemented, including systems that obtain location information from a cellular communications network, and systems that obtain location information through inertial guidance techniques.

In addition, some wireless networks have the ability to determine an approximate location of a terminal that is registered to the system. Such location information can be used, for example, to provide location information to emergency operators when a terminal is used to call for emergency help.

SUMMARY

Methods according to some embodiments of the invention include estimating a current geographic position of a mobile terminal including a communication module and a display screen, and determining if the estimated current position of the mobile terminal is within a boundary of geographic map information stored in the mobile terminal. If the current position of the mobile terminal is within the boundary of the stored geographic map information, the map including the current position of the mobile terminal is displayed on the display. If the current position of the mobile terminal is not within the boundary of the stored geographic map information, additional geographic map information including the current position of the mobile terminal is provided to the mobile terminal using the communication module.

The methods may further include determining a current scale for the map, and determining if the stored map information contains enough map information to fill the display screen at the current scale. If the stored map information does not contain enough map information to fill the display screen at the current scale, the scale of the display screen can be reduced until the stored map information is sufficient to fill the display screen at the reduced scale.

The methods may further include retrieving additional map information using the communication module sufficient to fill the display screen at the current scale, and after the additional map information has been retrieved, increasing the scale to the current scale.

The methods may further include determining a current scale for the display screen by estimating a current speed of the mobile terminal and selecting a display scale in response to the current speed of the mobile terminal. Determining the current scale may include selecting a relatively larger scale if the speed of the mobile terminal is higher and selecting a smaller scale if the speed of the mobile terminal is smaller.

The methods may further include estimating a current speed and direction of travel of the mobile terminal and estimating, in response to the current speed and direction of travel of the mobile terminal, when the mobile terminal will leave an area described by the stored map information.

The methods may further include estimating an amount of time needed to download additional map information for a geographic area that the mobile terminal is heading toward, and downloading the additional map information before the mobile terminal leaves the area described by the stored map information.

Estimating the current position of the mobile terminal may be performed by a remote server in response to network-generated location information. The methods may further include transmitting additional map information to the mobile terminal from the remote server if the current position of the mobile terminal is not within the boundary of the stored geographic map information.

Displaying the map including the current position of the mobile terminal on the display may include displaying the map on the display after a predetermined period of nonuse of the mobile terminal.

The mobile terminal may further include a secondary display screen on a flip portion of the device that is movable between an open position and a closed position so that the secondary display screen is visible when the flip portion is in the closed position. The methods may include displaying the map including the current position of the mobile terminal on the secondary display when the flip portion is in the closed position.

The methods may further include determining that the mobile terminal has entered an idle mode, and reducing a brightness of the display and/or turning the display off. Estimating the current geographic position of the mobile terminal and determining if the estimated current position of the mobile terminal is within the boundary of geographic map information stored in the mobile terminal may be performed while the mobile terminal is in the idle mode. Furthermore, providing additional geographic map information to the mobile terminal using the communication module may be performed while the mobile terminal is in the idle mode.

A mobile terminal according to some embodiments of the invention includes a communication module, a display screen, and control circuitry. The circuitry is configured to estimate a current geographic position of the mobile terminal, and to determine if the estimated current position of the mobile terminal is within a boundary of geographic map information stored in the mobile terminal. The circuitry is further configured to display the map including the current position of the mobile terminal on the display if the current position of the mobile terminal is within the boundary of the stored geographic map information, and to retrieve additional geographic map information including the current position of the mobile terminal using the communication module if the current position of the mobile terminal is not within the boundary of the stored geographic map information.

The circuitry may be further configured to determine a current scale for the map, to determine if the stored map information contains enough map information to fill the display screen at the current scale, and to reduce the scale of the display screen until the stored map information is sufficient to fill the display screen at the reduced scale if the stored map information does not contain enough map information to fill the display screen at the current scale.

The circuitry may be further configured to retrieve additional map information using the communication module, and to increase the scale to an increased scale that is larger than the reduced scale after the additional map information has been retrieved.

The circuitry may be further configured to determine a current scale for the display screen by estimating a current speed of the mobile terminal and to select a display scale in response to the current speed of the mobile terminal.

The circuitry may be further configured to estimate a current speed and direction of travel of the mobile terminal, and, in response to the current speed and direction of travel of the mobile terminal, to estimate when the mobile terminal will leave an area described by the stored map information. The circuitry may be further configured to estimate an amount of time needed to download additional map information for a geographic area that the mobile terminal is heading toward, and to download the additional map information before the mobile terminal leaves the area described by the stored map information.

A map server according to some embodiments of the invention includes a communication module configured to communicate with a remotely located mobile terminal, a position/velocity determination unit configured to estimate position/velocity information for the mobile terminal, a database storing map information, and a circuitry configured to determine if the estimated current position of the mobile terminal is within a boundary of geographic map information stored in the mobile terminal, and to send additional geographic map information from the database including the current position of the mobile terminal using the communication module if the current position of the mobile terminal is not within the boundary of the stored geographic map information.

The position/velocity determination unit may be configured to estimate the current position of the mobile terminal using location information provided by a communication network in which the mobile terminal is registered.

The circuitry may be further configured to estimate when the mobile terminal will leave an area described by the map information stored at the mobile terminal using the position/velocity of the mobile terminal, to estimate an amount of time needed to download additional map information for a geographic area that the mobile terminal is heading toward, and to transmit the additional map information to the mobile terminal before the mobile terminal leaves the area described by the map information stored at the mobile terminal.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
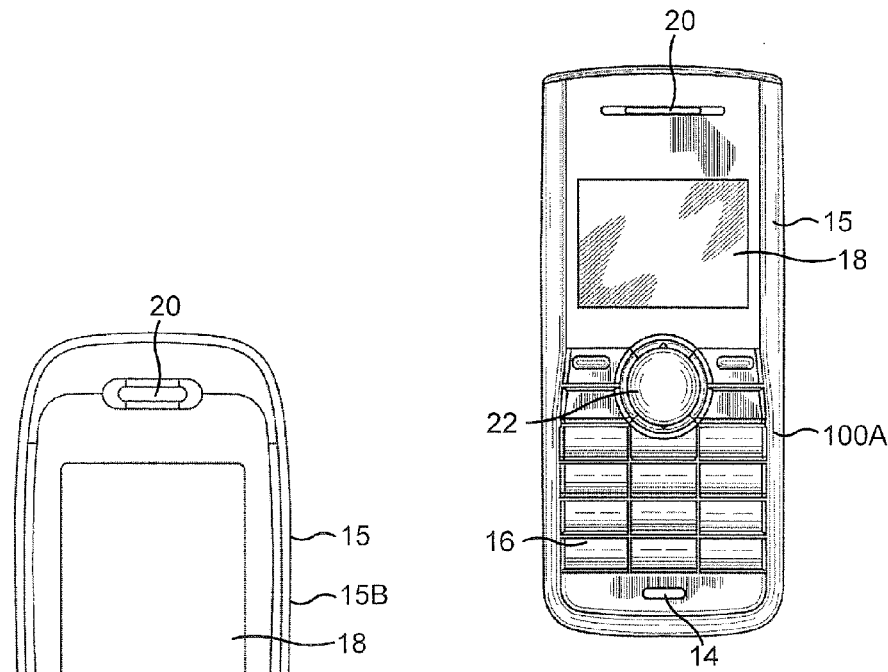
FIG. 1 illustrates an electronic device according to some embodiments of the invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods and communication terminals. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), a digital television network such as a DVB-H network, a satellite network, an AM/FM broadcast transmitter, and/or another communication terminal. A communication terminal that is configured to communicate over a wireless interface may be referred to as a "wireless communication terminal," a "wireless terminal" and/or a "mobile terminal." Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Wireless communication between electronic devices may be accomplished using a wide variety of communication media, communication systems and communication standards. For example, mobile terminals such as wireless mobile telephones are typically configured to communicate via analog and/or digital wireless radio frequency (RF) telephone systems. Such devices may additionally be configured to communicate using wired and/or wireless local area networks (LANs), short range communication channels, such as Bluetooth RF communication channels and/or infrared communication channels, and/or long range communication systems, such as satellite communication systems.

Mobile terminals, such as wireless mobile telephones, according to embodiments of the invention can have a variety of shapes, sizes and housing types. Examples of several types of mobile telephone housings are shown in FIGS. 1 to 2B. For example, a mobile terminal 100A according to some embodiments is illustrated in FIG. 1. The mobile terminal 100A includes a housing 15 that houses and protects the electronics of the mobile terminal 100A. The mobile terminal 100A includes an LCD display 18 and a keypad 16. The mobile terminal 100A further includes a multifunction control/input button 22 that can be used to select menu items and/or to input commands to the mobile terminal 100A.

The mobile terminal 100A includes a microphone port 14 and an earphone/speaker 20. The housing 15 may be designed to form an acoustic seal to the user's ear when the earphone/speaker 20 is placed against the user's head. The mobile terminal 100A may be configured to play video files and or audio files, such as song files, which may be stereophonic signals.

Figure 2A:
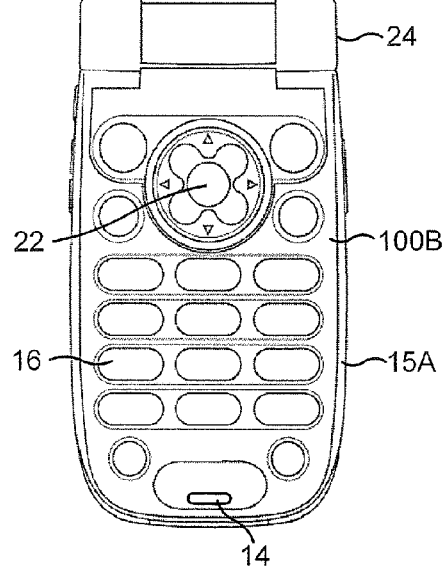
FIGS. 2A-2B illustrate a flip-type mobile telephone according to some embodiments of the invention.
Figure 2B:
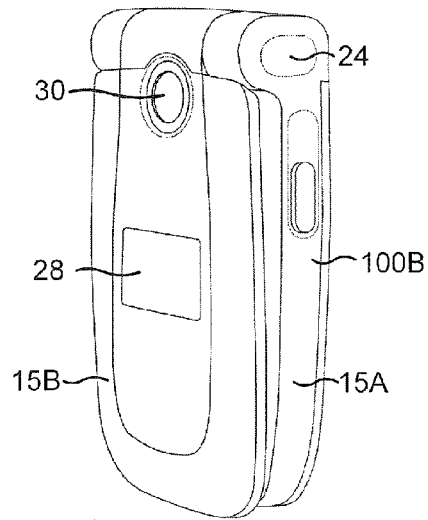

A flip-style mobile terminal 100B is illustrated in FIGS. 2A and 2B. The flip-style mobile terminal 100B is shown in the open position in FIG. 2A and the closed position in FIG. 2B. The mobile terminal 100B includes a housing 15 that includes a lower housing 15A and an upper housing, or "flip" portion 15B that are rotatably connected by means of a hinge 24. The mobile terminal 100B includes a primary LCD display 18 on the inside of the flip 15B and a keypad 16 on the inside of the lower housing 15A. The mobile terminal 100B further includes a multifunction control/input button 22.

The mobile terminal 100A includes a microphone port 14 on the lower housing 15A and an earphone/speaker 20 on the inside of the flip 15B. As shown in FIG. 2B, a secondary display 28 and a camera lens 30 may be located on the outside of the flip 15B.

Figure 3:
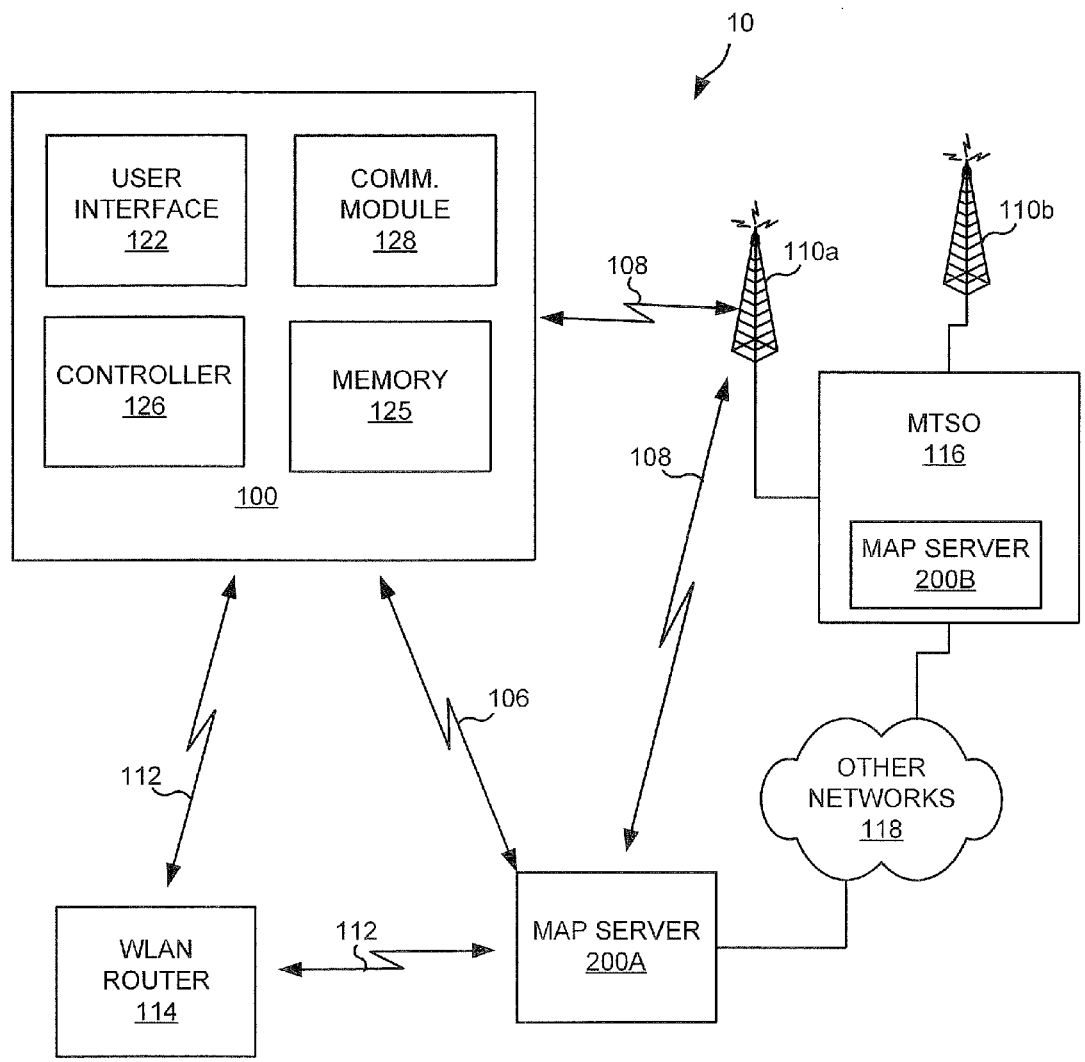
FIG. 3 is a schematic block diagram illustrating an electronic device and a cellular communication system in accordance with some embodiments of the present invention.

FIG. 3 is a schematic block diagram of a wireless communication system 10 that includes a mobile terminal 100 that is configured to communicate with a map server 200A, 200B. For example, the mobile terminal 100 can communicate with the map server 200A over a direct wireless communication interface 106, over another wireless communication interface 108 through one or more cellular base stations 110a-b, and/or over another wireless communication interface 112 through a wireless local area network (WLAN) access point 114. The direct wireless communication interface 106 may include an RF wireless communication interface such as a Bluetooth interface or an infrared communication interface, such as, for example, the infrared communication interface defined by the Infrared Data Association (IRDA) protocols. The IRDA defines a number of standards for infrared wireless data communication, including standards for infrared wireless communication at data rates up to 16 Mb/s. It will be appreciated that the mobile terminal 100 may be a handheld wireless communication terminal, such as a mobile telephone, PDA, or the like.

As further illustrated in FIG. 3, the mobile terminal 100 can include a user interface 122, a controller 126, a communication module 128, and a memory 125.

The communication module 128 is configured to communicate data over one or more of the wireless interfaces 106, 108, and/or 112 to another remote terminal or other communication device, such as the map server 200A, 200B. The memory 125 is configured to store programs and or data for use by the controller 126. The memory 125 may include a nonvolatile memory that is capable of storing digital information even when power to the mobile terminal 100 is switched off.

The communication module 128 can include, for example, a cellular communication module, a Bluetooth module, an infrared communication module, and/or a WLAN module. With a cellular communication module, the mobile terminal 100 can communicate via the base stations 110a-b using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations 110a-b may be connected to a Mobile Telephone Switching Office (MTSO) 116, which, in turn, may be connected to one or more other networks 118 (e.g. the Internet, a public switched telephone network, and/or another network). With a Bluetooth or infrared module, the mobile terminal 100 can communicate via an ad-hoc network using the direct interface 106. With a WLAN module, the mobile terminal 100 can communicate through the WLAN router 114 using a communication protocol that may include, but is not limited to, 802.11a, 802.11b, 802.11e, 802.11g, and/or 802.11i. A mobile telephone may also be configured to communicate directly over the networks 118.

The mobile terminal 100 may be configured to transmit and/or receive a digital data signal to/from another communication terminal that may be communicatively coupled thereto through, for example the MTSO 116, and/or another network 118, such as a public switched telephone network (PSTN). However, it will be appreciated from the foregoing description that data communication between the mobile terminal 100 and another terminal may be accomplished without using the MTSO 116 or the other networks 118.

The mobile terminal 100 my additionally include an AM/FM radio tuner, a UHF/VHF tuner, a satellite radio tuner, a DVB-H receiver, and/or another receiver configured to receive a broadcast audio/video signal and/or data signal.

The map server 200A can be a standalone server that is configured to communicate with the mobile terminal 100 over wireless communication links, such as the WLAN communication link 112, a direct wireless communication link 106, and/or another wireless communication interface 108 through one or more cellular base stations 110*a-b*. For example, the map server 200A could be configured to broadcast a data signal including map information over the wireless communication link 106 to mobile terminals, such as mobile terminal 100, within a geographic service area. That is, the map server 200A could broadcast maps of a particular geographic area to mobile terminals, such as mobile terminal 100, within the geographic area. In some embodiments, the wireless communication link 106 could be a one-way communication link, and maps could be broadcast over the one-way wireless communication link 106 blindly, i.e. without knowledge of any mobile terminals 100 within the geographic area. In other embodiments, the wireless communication link 106 could be a one-way communication link, and map information could be broadcast or otherwise transmitted on demand to a requesting mobile terminal 100 in response to a request received over a separate communication link, such as the WLAN communication link 112 and/or a cellular communication link 108.

The map server 200B can be located within or otherwise controlled by a mobile telephone switching office (MTSO) 116, in which case the map server 200B may communicate with the wireless telephone 100 primarily using the wireless communication interface 108.

Figure 4A:
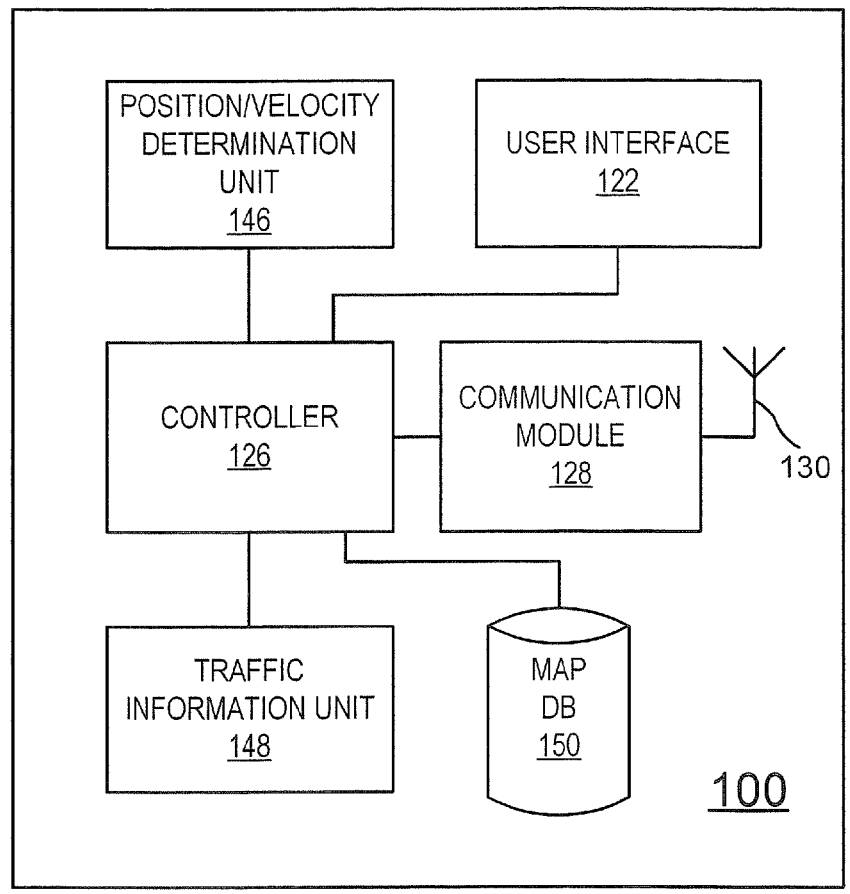
FIGS. 4A and 4B are a schematic block diagrams illustrating some aspects of an electronic device in accordance with some embodiments of the present invention.
Figure 4B:
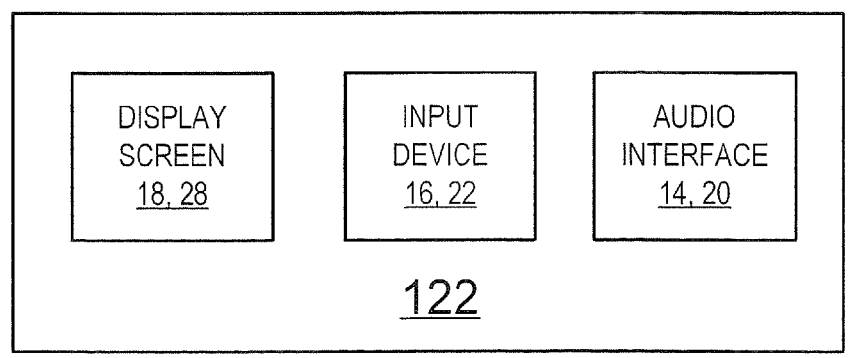

Some further aspects of a mobile terminal 100 according to some embodiments of the invention are illustrated in FIGS. 4A and 4B. As shown therein, a mobile terminal 100 may further include a position/velocity determination unit 146 and a traffic information unit 148. The position/velocity determination unit 146 and the traffic information unit 148 may communicate with the communication module 128 through the controller 126 as shown in FIG. 3. Alternatively or additionally, the position/velocity determination unit 146 and/or the traffic information unit 148 may communicate directly with the communication module 128, for example through a system bus.

According to some embodiments, the position/velocity determination unit 146 may be configured to determine a current position and/or velocity of the mobile terminal 100. For example, the position/velocity determination unit 146 may include a global positioning system (GPS) receiver that permits the position/velocity determination unit 146 to determine the location of the mobile terminal 100 with a high degree of precision. The position/velocity determination unit 146 may include other systems and/or functionality for determining the location of the mobile terminal 100. For example, the position/velocity determination unit 146 may be configured to obtain location information for the mobile terminal 100 from a cellular communications network with which the mobile terminal 100 communicates. The position/velocity determination unit 146 may additionally or alternatively include an inertial guidance system that permits the position/velocity determination unit 146 to determine a position/velocity of the mobile terminal 100 through inertial movement from a known position.

The traffic information unit 148 is configured to obtain information about current automobile and/or pedestrian traffic in or near a location at which the mobile terminal 100 is located and/or near a destination point, or along a route from a current location of the mobile terminal 100 to a destination point. For example, traffic information may be broadcast in one or more data subchannels of a public and/or private communication network that may be received by the mobile terminal 100. For example, Traffic Message Channel (TMC) data is available in a number of cities throughout North America and Europe. TMC data is broadcast continuously on FM radio channels, and may provide notification of accidents, road construction, police, or emergency action, etc.

Traffic information obtained by the traffic information unit 148 may be used by the controller 126 to determine estimated travel times and/or route information for a user of the mobile terminal 100.

The mobile terminal 100 may further include a map database 150 that contains map information concerning a geographic area in which the mobile terminal 100 is located, and/or in which a destination point is located. For example, the map database 150 may contain street/road information and/or may contain map information for other areas, such as pedestrian walking areas. The map information may further include information regarding features, such as buildings, fences, rivers, etc., that may constrain the motion of a user of the mobile terminal 100.

Although the map database 150 is shown as a component of the terminal 102, it will be appreciated that the map database 150, and/or a portion of the map database 150, may be located remotely from the mobile terminal 100. For example, the map database 150 may be stored remotely and accessed through the communication module 128. A portion of the map database 150 may be retrieved and stored locally at the mobile terminal 100. Remote storage of the map database 150 may be desirable, since memory storage space in the mobile terminal 100 may be limited, and a map database may consume a significant amount of memory. In some embodiments, the map database 150 may be stored at a map server 200A, 200B.

Referring to FIG. 4B, the user interface 122 can include an input device 134, such as a keypad 16, multifunction key 22, keyboard, touchpad, jog dial and/or other user input device. The user interface 122 may further include a primary display screen 18, such as an LCD display that is capable of displaying video signals in a video format, such as Quarter VGA (QVGA, 320×240 pixels), Common Intermediate Format (CIF, 360×288 pixels) and/or Quarter Common Intermediate Format (QCIF, 180×144 pixels). The mobile terminal 100 may include appropriate CODECs to permit the mobile terminal 100 to decode and display video signals in various formats. A secondary display screen 28 may also be provided.

The user interface 122 can also include an audio interface unit including a microphone 14 coupled to an audio processor that is configured to generate an audio signal responsive to sound incident on the microphone, and a speaker 20 that generates sound responsive to an output audio signal.

According to some embodiments, a navigational aid, such as a map, may be displayed on the primary display screen 18 and/or the secondary display screen 28. Furthermore, alerts and or navigational information may be communicated to a user of the mobile terminal 100 through the audio interface.

Figure 5:
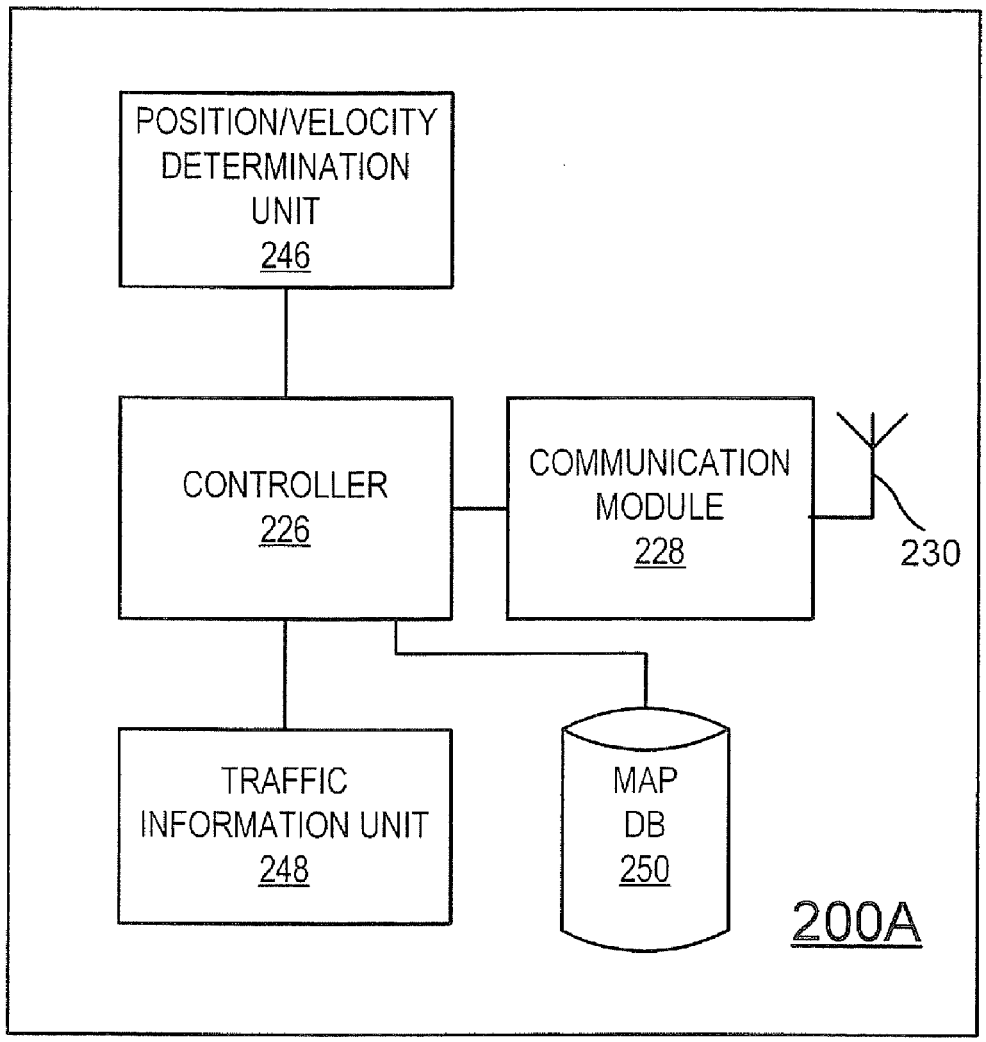
FIG. 5 is a schematic block diagram illustrating a map server in accordance with some embodiments of the present invention.

Some aspects of a map server 200A according to some embodiments of the invention are illustrated in FIG. 5. As shown therein, a map server 200A may include a position/velocity determination unit 246 and a traffic information unit 248. The position/velocity determination unit 246 and the traffic information unit 248 may communicate with the communication module 228 through the controller 226 as shown in FIG. 5. Alternatively or additionally, the position/velocity determination unit 246 and/or the traffic information unit 248 may communicate directly with the communication module 228, for example through a system bus.

According to some embodiments, the position/velocity determination unit 246 may be configured to determine a current position and/or velocity of a remotely located mobile terminal 100. For example, the position/velocity determination unit 246 may receive global positioning system (GPS) information from the mobile terminal 100 that permits the position/velocity determination unit 246 to determine the location of the mobile terminal 100 with a high degree of precision. The position/velocity determination unit 246 may include other systems and/or functionality for determining the location of the mobile terminal 100. For example, the position/velocity determination unit 246 may be configured to obtain location information for the mobile terminal 100 from a cellular communications network on which the mobile terminal 100 is registered.

The traffic information unit 248 is configured to obtain information about current automobile and/or pedestrian traffic in or near a location at which the mobile terminal 100 is located and/or near a destination point, or along a route from a current location of the mobile terminal 100 to a destination point.

Traffic information obtained by the traffic information unit 248 may be used by the controller 226 to determine estimated travel times and/or route information for a user of the mobile terminal 100.

The map server 200 may further include a map database 250 that contains map information concerning a wide geographic area in which the mobile terminal 100 may be located. For example, the map database 250 may contain street/road information and/or may contain map information for other areas, such as pedestrian walking areas. The map information may further include information regarding features, such as buildings, fences, rivers, etc., that may constrain the motion of a user of the mobile terminal 100.

According to some embodiments, a position of a mobile terminal 100 is determined. In some embodiments, the position of the mobile telephone may be determined by the position/velocity determination unit 146. In other embodiments, the position of the mobile terminal 100 may be determined by an element in the network 10 (FIG. 3). For example, the position of the mobile telephone may be determined by map server 200A or 200B.

The mobile terminal 100 and/or the map server 200A, 200B may then determine if the estimated current position of the mobile terminal 100 is within a boundary of geographic map information stored in the mobile terminal 100, e.g. within a boundary of a map stored in short term memory, such as within the memory 125 (e.g. a RAM cache) and/or stored in the map database 150. If the current position of the mobile terminal 100 is within the boundary of the stored geographic map information, the mobile terminal 100 may display a map including the current position of the mobile terminal 100 on its primary display 18 and/or secondary display 28.

If the current position of the mobile terminal 100 is not within the boundary of the geographic map information stored in the mobile terminal 100, geographic map information including the current position of the mobile terminal 100 may be retrieved by the mobile terminal 100 and/or pushed to the mobile terminal 100 from the map server 200A, 200B using the communication module 128. Thus, in some embodiments, it may not be necessary for the mobile terminal 100 to store large amounts of map information locally in the map database 150. Instead, the mobile terminal 100 may be able to download only the map information needed to be displayed at a given time. Old and/or unused map information may be stored locally, e.g. within the memory 125 and/or the map database 150, but may be deleted as required to provide space for newer map information.

Furthermore, the map of the current location of the mobile terminal 100 may be displayed continuously, for example as a screen saver or background, on the primary display 18 or secondary display 28, so that the map information may be readily available to the user without having to select a menu item, press a key, or otherwise issue a command to display the current map.

The mobile terminal 100 may be configured to enter an idle mode or battery savings mode after a period of inactivity to preserve battery power when the mobile terminal is not connected to an external power source. Upon entering the idle or battery savings mode, the primary display 18 and/or the secondary display 28 can be dimmed and/or the backlight can be turned off, but the mobile terminal 100 may continue to track and update its position/velocity. In some embodiments, the primary display 18 and/or the secondary display 28 can be turned off, but the position/velocity of the mobile terminal 100 can still be computed, and new map information can be downloaded as needed. When the mobile terminal "wakes up" (e.g. when the user presses a button), the new position can be easily and quickly updated on the display without the user having to wait for a position update and/or new map information to be downloaded.

Figure 6A:
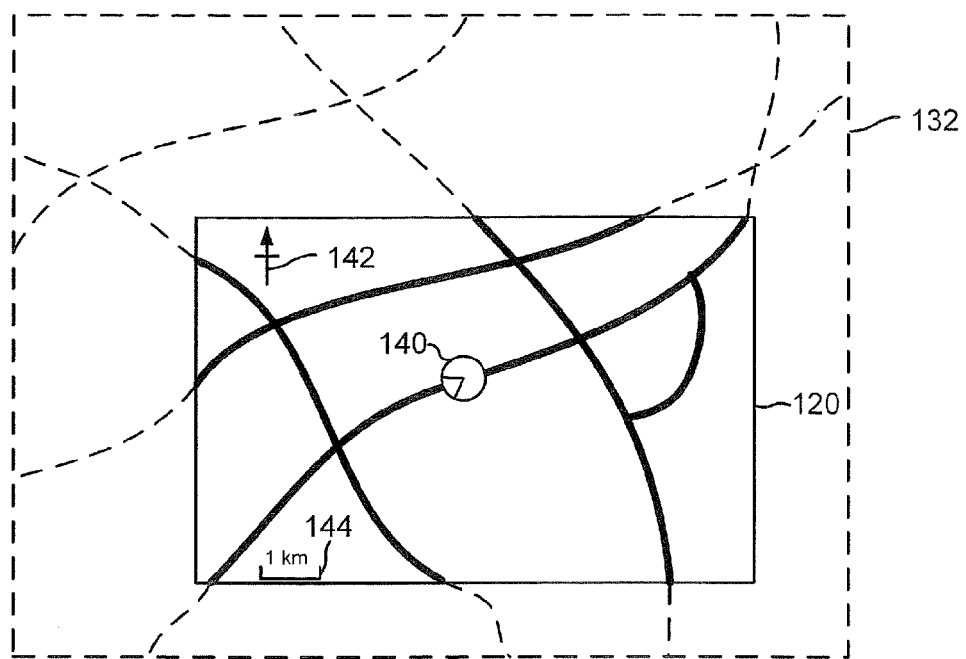
FIGS. 6A, 6B, 7A, 7B and 7C are exemplary illustrations of display screens configured according to some embodiments of the invention.

Sample display images according to embodiments of the invention are shown in FIGS. 6A-6B and 7A-7B. For example, FIG. 6A illustrates a map image 120 that may be displayed on a primary display 18 and/or a secondary display 28 of a mobile terminal 100. The location of the mobile terminal 100 is indicated by an icon 140 that can indicate both position and direction of travel of the mobile terminal 100. In the display illustrated in FIG. 6A, the icon 140 is centered in the display, which also includes an icon 142 indicating the direction of north, as well as a scale indicator 144 showing a distance per unit of the display screen. In the illustrated example, the scale is 1 km per unit. Other scale indicators could be used. For example, a grid pattern could be superimposed on the display, with each grid division representing a particular distance (e.g. 1 km, 100 m, etc.).

To display the map image 120, the map database 150 of the mobile terminal 100 includes map information for the entire area shown in the map image 120. In addition, the map database 150 may contain map information for other areas, such as areas surrounding the area shown in the map image 120. The additional map information stored in the map database 150 of the mobile terminal 100 but not currently displayed is illustrated in FIG. 6A as the area 132 shown in dashed lines. As the mobile terminal 100 moves, the map image 120 can also move to keep the icon 140 corresponding to the mobile terminal 100 centered in the map image 120.

Figure 6B:
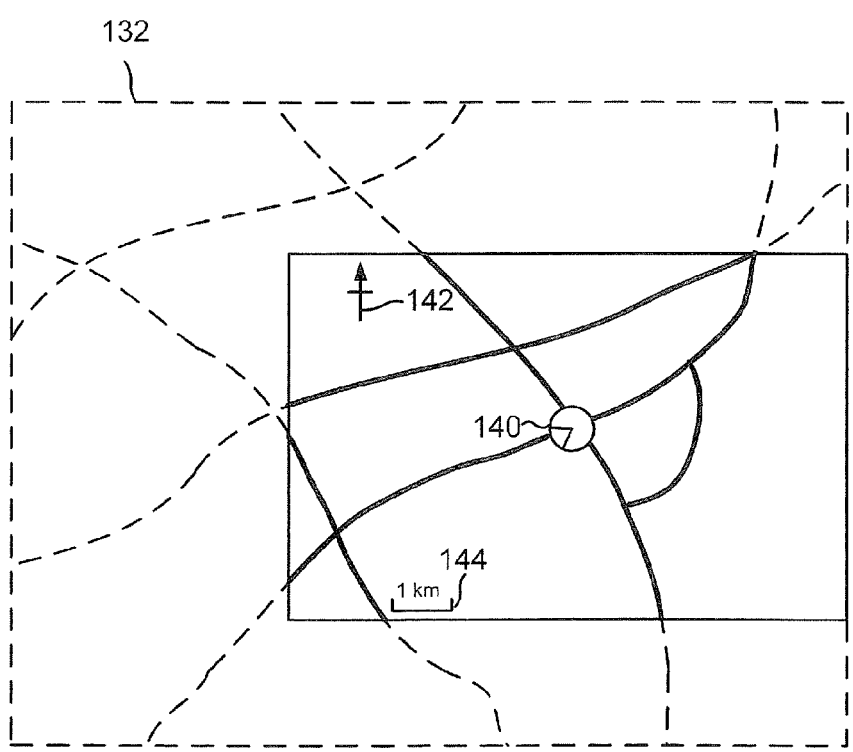
Figure 7A:
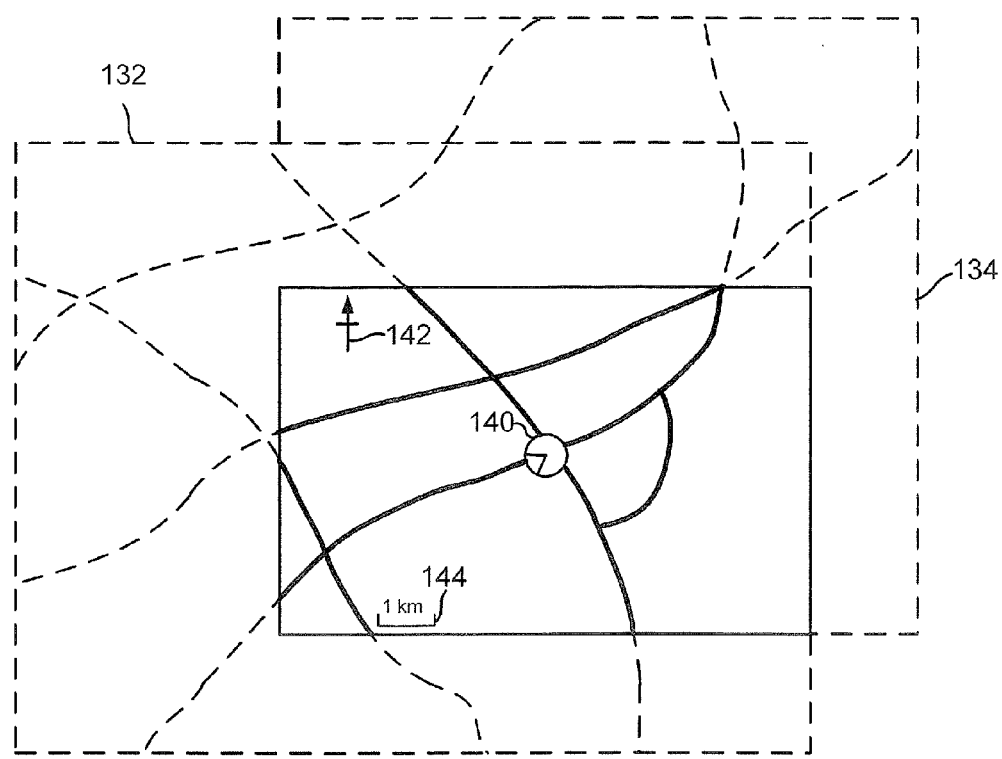

When the mobile terminal 100 moves close to an edge or boundary of the map information stored in the map database 150, the mobile terminal 100 may download additional map information from the map server 200A, 200B. For example, as shown in FIG. 6B, the mobile terminal 100 100, as indicated by the icon 140, has moved so far that the edge of the display image 120 has reached the edge of the map information 132 stored in the map database 150 of the mobile terminal 100. Referring to FIG. 7A, additional map information 134 may be downloaded from the map server 200A, 200B for an area into which the mobile terminal 100 is moving.

Figure 7B:
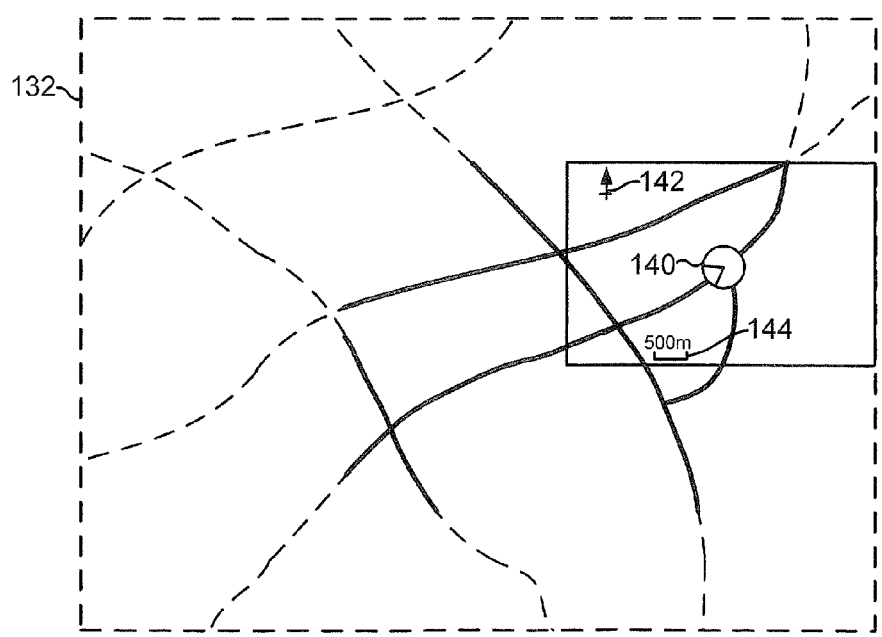
Figure 7C:
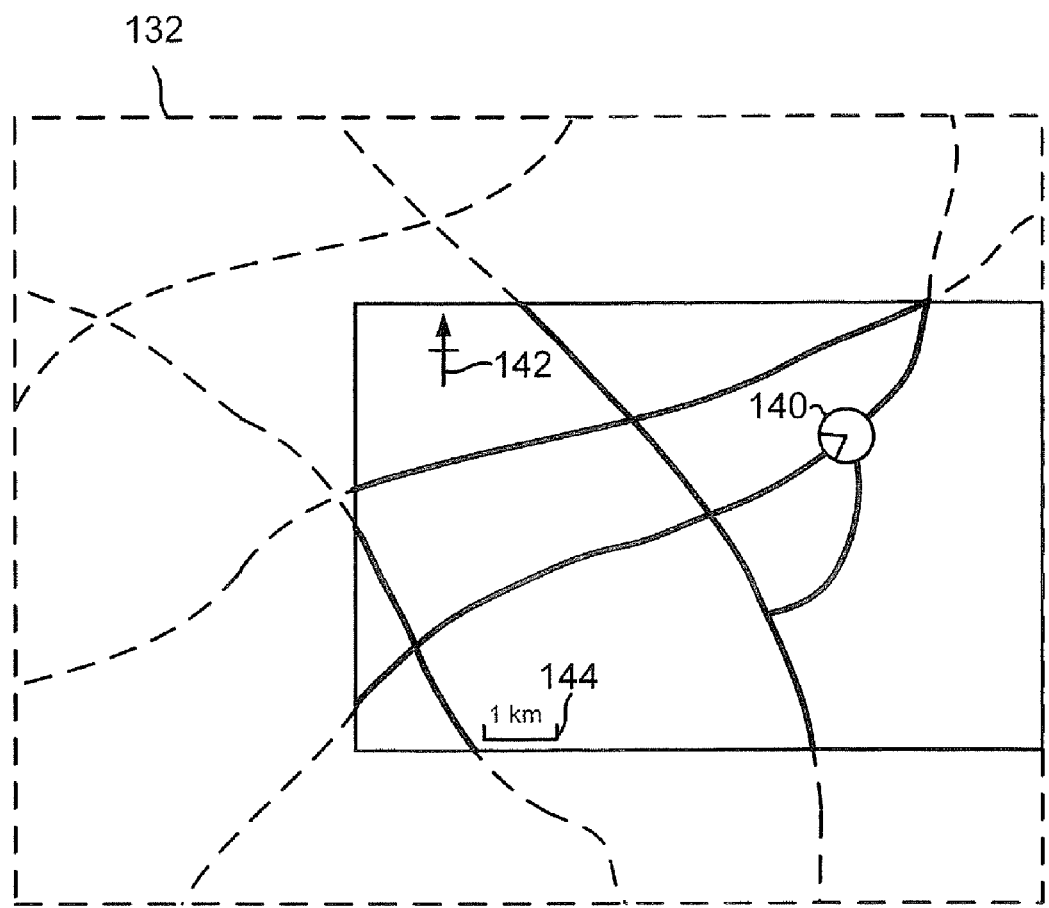

In some embodiments, additional map information may be downloaded to the mobile terminal 100 before the mobile terminal 100 moves so close to an edge or boundary of the map information 132 stored in the map database 150 that the mobile terminal 100 would run out of map information to display on the display screen 18, 28 at the current scale. However, if for some reason, such as network congestion and/or unavailability of the map server 200A, 200B, the mobile terminal 100 cannot retrieve sufficient map information 132 to display a full screen at the current scale, the mobile terminal 100 may change the scale of display of the map so that stored map information continues to be displayed on the screen. For example, as shown in FIG. 7B, as the mobile terminal 100 moves to the edge of the stored map information 132, the scale is reduced to 500 m per unit. Alternatively, if the mobile terminal 100 cannot retrieve sufficient additional map information 134 to display a full screen at the current scale, the mobile terminal 100 may maintain the current scale and move the icon 140 representing the mobile terminal 100 off of the center of the display image 120 as shown in FIG. 7C until additional map information 134 has been downloaded.

Accordingly, some embodiments of the invention may include determining a current scale for the map, and determining if the stored map information contains enough map information to fill the display screen at the current scale. If the stored map information does not contain enough map information to fill the display screen at the current scale, the scale of the display screen may be reduced until the stored map information is sufficient to fill the display screen at the reduced scale, and the map may be displayed on the display screen 18, 28 at the reduced scale, or the icon 140 representing the mobile terminal 100 may be moved away from the center of the display 120.

Once the additional map information has been downloaded from the map server 200A, 200B, the scale may be increased (e.g., the scale of the display may be increased back to the previous scale) and/or the icon 140 may be moved back to the center of the display.

Some embodiments may estimate a current speed and direction of travel of the mobile terminal 100 and estimate, in response to the current speed and direction of travel of the mobile terminal 100, when the mobile terminal 100 will leave an area described by the stored map information 132. The location at which the mobile terminal 100 will leave the area described by the stored map information 132 may be predicted based on the location of roads, the current speed and direction of the mobile terminal 100, congestion/traffic conditions and/or other factors. An amount of time needed to download additional map information for a geographic area that the mobile terminal 100 is heading toward may be estimated, and the additional map information may be downloaded before the mobile terminal 100 leaves the area described by the stored map information. In this manner, the map of the area in which the mobile terminal 100 is located may be displayed seamlessly while the mobile terminal 100 moves into areas for which it did not previously have map information.

In some embodiments, the scale of the display may be set in response to a speed of the mobile terminal 100. For example, at low speeds, a lower scale may be used, while at high speeds, a higher scale may be used. For example, at high speeds, a scale such as 1 km or higher per unit may be used, while at lower speeds, a scale less than 1 km per unit may be used.

Estimating the current position of the mobile terminal 100 may be performed by the mobile terminal 100 and/or may be performed by a remote server, such as a map server 200A, 200B, in response to network-generated location information.

In some embodiments, the map including the current position of the mobile terminal 100 may be displayed on the primary display 18 and/or the secondary display 28 after a predetermined period of nonuse of the mobile terminal 100, e.g. as a screen saver or default image.

In some embodiments, the mobile terminal 100 may include a secondary display screen 28 on a flip portion that is movable between an open position and a closed position so that the secondary display screen 28 is visible when the flip portion is in the closed position, as illustrated in FIGS. 2A and 2B. In that case, the map including the current position of the mobile terminal 100 may be displayed on the secondary display when the flip portion is in the closed position.

Figure 8:
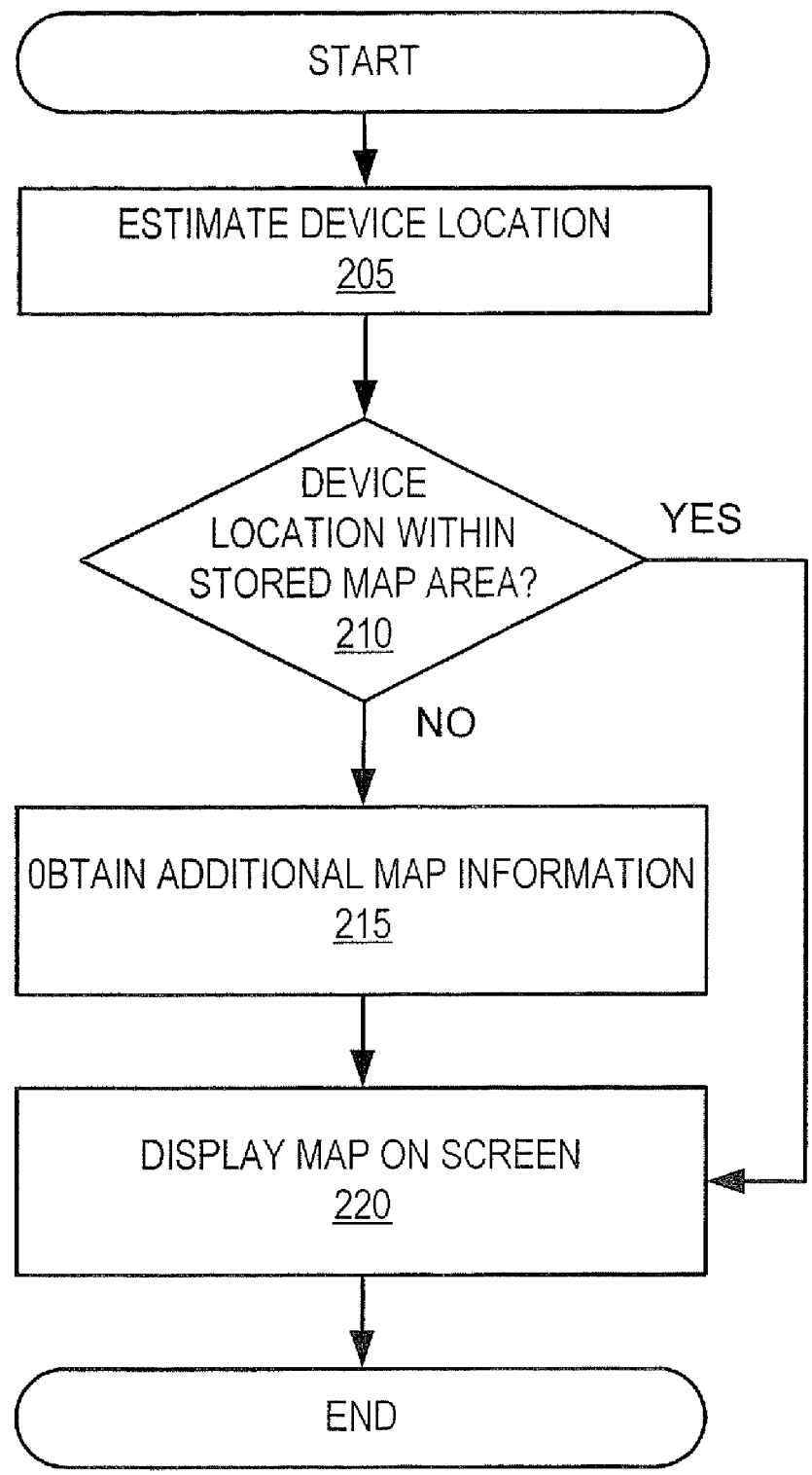
FIGS. 8-11 are flow diagrams illustrating operations of electronic devices according to some embodiments of the invention.
Figure 9:
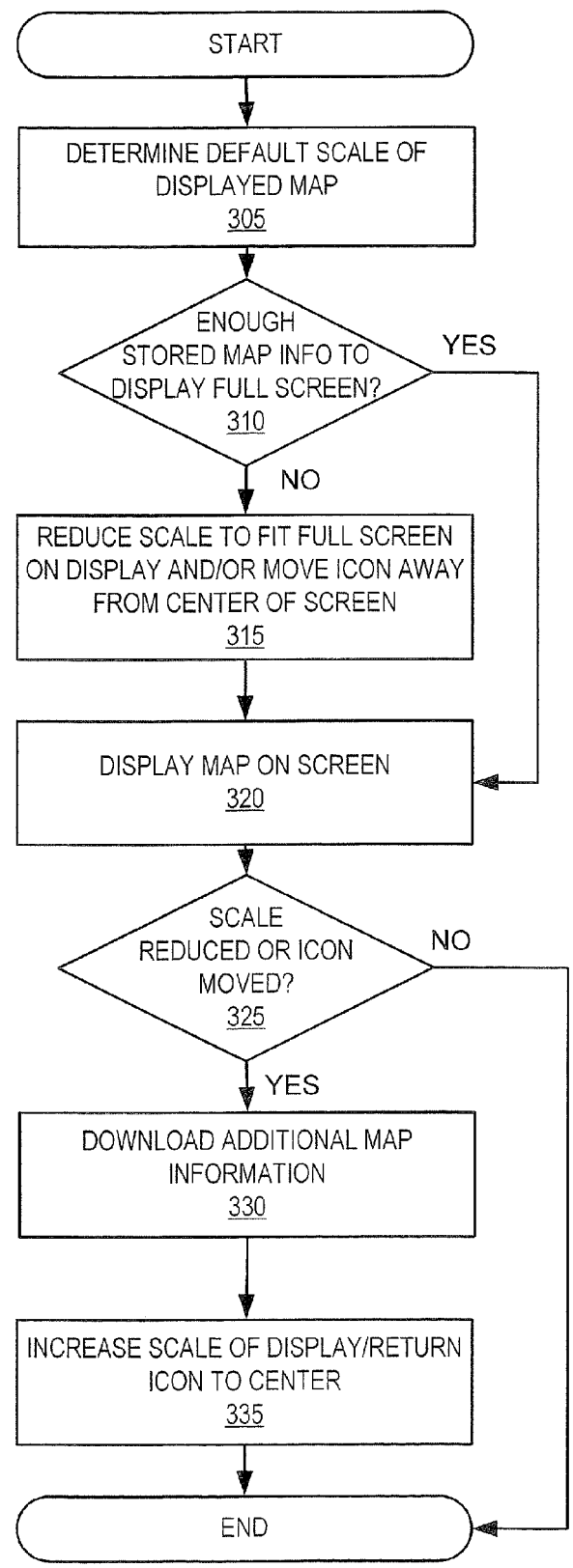
Figure 10:
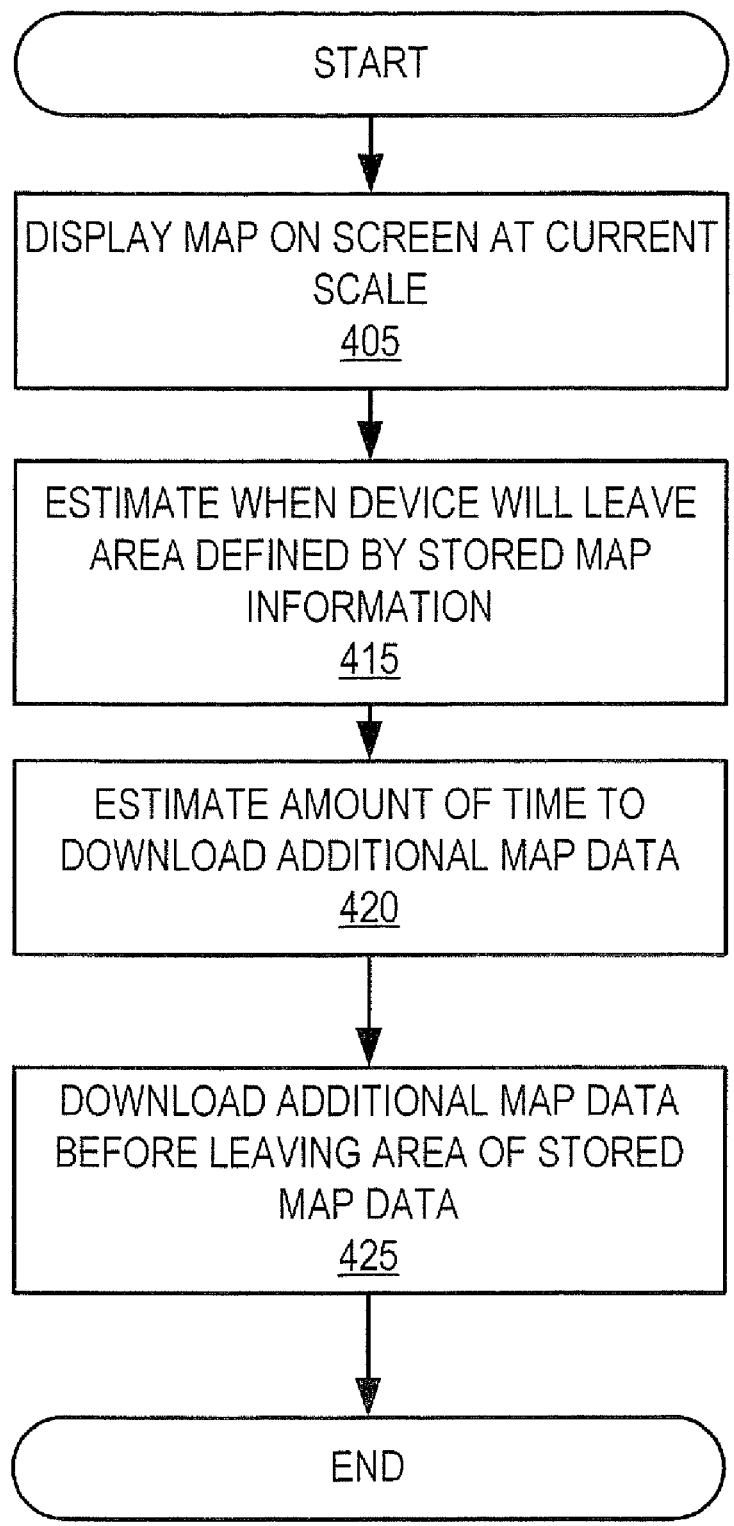

FIGS. 8-10 are flow diagrams illustrating operations of electronic devices according to some embodiments of the invention. For example, as illustrated in the flowchart of FIG. 8, according to some embodiments, a location of a device, such as a mobile terminal 100, is estimated (Block 205). As noted above, the location of the device 100 can be estimated by the device itself using GPS location, inertial navigation or any other suitable technique. The location of the device 100 can also be determined, for example, by a remote server, such as a map server 200A, 200B using network-based location techniques and/or using information provided by the mobile terminal 100.

In Block 210, a determination is made as to whether the mobile terminal 100 is located within an area described by map information stored locally in the mobile terminal 100, such as in the map database 150 of the mobile terminal 100.

If the device 100 is located in the area described by map information stored locally in the mobile terminal 100, the map is displayed on a screen of the mobile terminal 100, such as the primary display 18 and/or a secondary display 28 (Block 220).

However, if the device is not located in an area described by locally-stored map information (i.e. the device 100 does not have a map of its current location), then additional map information may be obtained (Block 215). The additional map information may be downloaded from a remote server, such as a map server 200A, 200B, and/or the additional map information may be pushed from a remote server, such as a map server 200A, 200B, to the mobile terminal 100, without first receiving a request from the mobile terminal 100. Once the additional map data has been received by the mobile terminal 100, the map may be displayed on a screen of the mobile terminal 100, such as the primary screen 18 and/or the secondary screen 28.

Further embodiments of the invention are illustrated in the flowchart of FIG. 9. As shown therein, in Block 305 a default scale for displaying map information on a screen of the mobile terminal 100 is determined. Next, a check is made to see if the map information stored locally in the mobile terminal 100, such as in the map database 150 of the mobile terminal 100, is sufficient to display a full screen of information at the default scale (Block 310). If so, the map is displayed on the screen (Block 320).

However, if the locally stored map information is not sufficient to display a full screen, the scale of the display may be reduced and/or the icon 140 representing the mobile terminal 100 can be moved away from the center of the display image 120 (Block 315) until a sufficient amount of map information is stored locally to permit display of a full screen (Block 310). The map may then be displayed on the display screen at the modified (reduced) scale (Block 320).

A check is made at Block 325 to see if the scale was reduced or if the icon 140 was moved at Block 315. If so, additional map data may be downloaded to the mobile terminal 100 (either upon request or pushed to the mobile terminal 100) (Block 330). The scale of the display may then be increased, for example to a default scale, and/or the icon 140 can be moved back to the center of the display image 120 (Block 335).

Further embodiments of the invention are illustrated in the flowchart of FIG. 10. As shown therein, in some embodiments, a mobile terminal 100 can display a map showing the location of the mobile terminal 100 at a current scale (Block 405). An estimate is generated of when the mobile terminal 100 will leave an area covered by map information stored locally in the mobile terminal 100, such as in a map database 150 (Block 415). The estimate can be based on factors, such as the speed and direction of the mobile terminal 100, the locations of roads, bridges, intersections, etc., that can affect travel time, traffic/congestion on the current route of the user of the mobile terminal 100, etc.

An estimate can also be made of the amount of time that would be used to download additional map data (Block 420). The additional map data can be transferred to the mobile terminal 100 just before the mobile terminal 100 leaves the area of the stored map data (Block 425). Accordingly, download of the additional map data can be delayed until the data is actually needed. This may potentially avoid downloading of unneeded map information.

Figure 11:
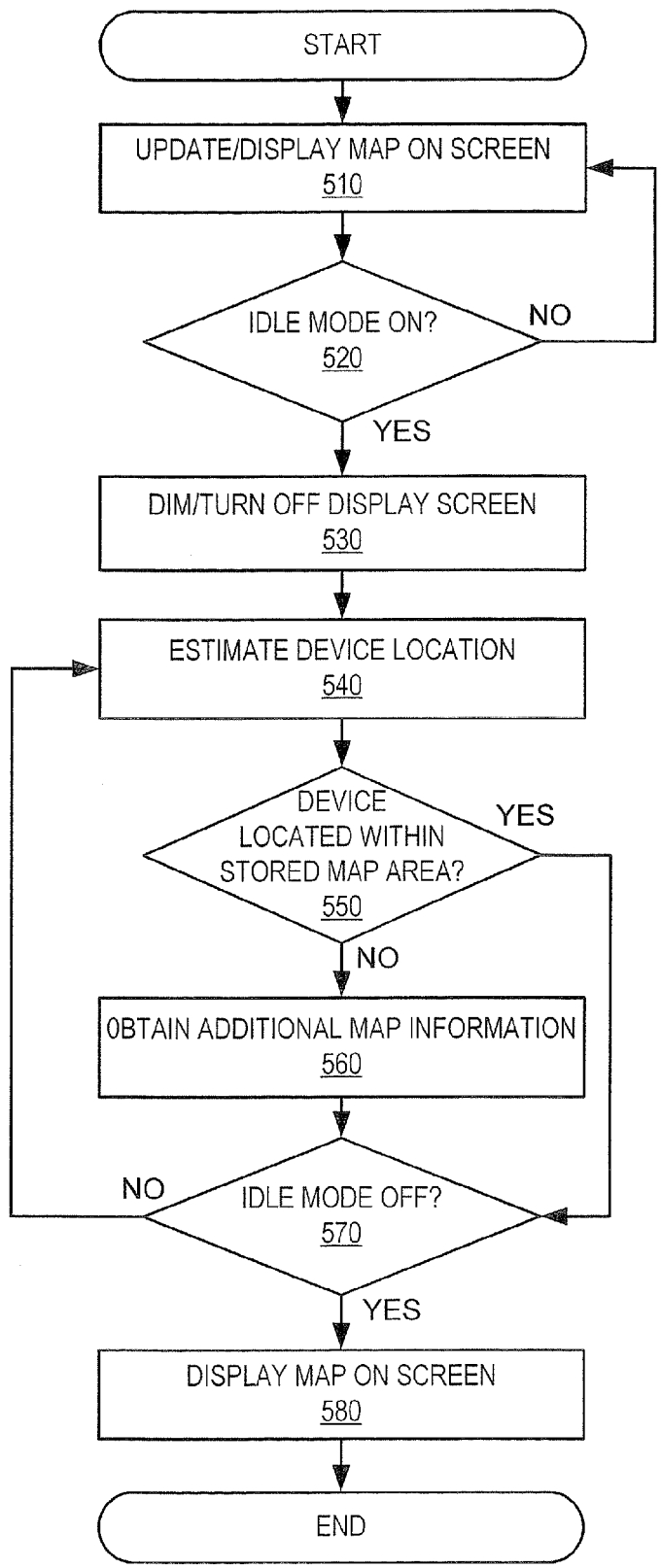

Further embodiments of the invention are illustrated in FIG. 11. As shown therein, in Block 510, the location of a mobile terminal 100 is updated and displayed on a display screen using, for example, the operations illustrated in FIG. 8. A check is made to see if the mobile terminal 100 has entered an idle or battery savings mode (Block 520). If not, the mobile terminal 100 continues to update and display its location as described.

If the mobile terminal 100 has entered an idle or battery savings mode, a display screen of the mobile terminal 100 can be dimmed (for example, by reducing the backlight brightness or turning the backlight off altogether) or turned off completely (Block 530). However, the mobile terminal 100 may continue to estimate its location (Block 540) and determine if its location is within an area covered by stored map information (Block 550). If not, the mobile terminal can obtain additional map information (Block 560) covering the geographic area in which the mobile terminal 100 is located.

The mobile terminal 100 then determines if it has exited the idle or battery savings mode (Block 570), and if so, displays the map including the current location of the mobile terminal 100 on the display screen (Block 580). Otherwise, operations return to block 540, and the mobile terminal continues to estimate it's location.

The present invention has been described in part with reference to FIGS. 8-11, which are flowchart illustrations illustrating exemplary operations according to aspects of the present invention. It will be understood that blocks of the flowchart illustrations of FIGS. 8-11, and combinations of blocks in the flowchart illustrations, may be implemented using electronic circuits included in terminals, such as the mobile terminal 100. It will also be appreciated that blocks of the flowchart illustrations of FIGS. 8-11, and combinations of blocks in the flowchart illustrations, may be implemented using components other than those illustrated in FIGS. 1 to 5, and that, in general, the blocks of the flowchart illustrations of FIGS. 8-11 and combinations of blocks in the flowchart illustrations, may be implemented in special purpose hardware such as discrete analog and/or digital circuitry, such as combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 8-11 support electronic circuits and other means for performing the specified functions/acts, as well as combinations of steps for performing the specified functions/acts. It will be understood that the circuits and other means supported by each block of the flowchart illustrations of FIGS. 8-11, and combinations of blocks therein, can be implemented by special purpose hardware, software or firmware operating on special or general purpose data processors, or combinations thereof.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method comprising:

estimating a current geographic position of a mobile terminal including a communication module and a display screen;

determining if the estimated current position of the mobile terminal is within a boundary of geographic map information stored in the mobile terminal, the geographic map information defining geographic features within a first geographic area;

in response to determining that the estimated current position of the mobile terminal is within the boundary of the stored geographic map information, displaying the map including the current position of the mobile terminal on the display;

in response to determining that the estimated current position of the mobile terminal is not within the boundary of the stored geographic map information, providing additional geographic map information to the mobile terminal using the communication module, the additional geographic map information defining geographic features within a second geographic area that includes the estimated current position of the mobile terminal; and determining a current scale for the display screen to display a map by estimating a current speed of the mobile terminal and automatically selecting a display scale in response to the current speed of the mobile terminal, wherein selecting the display scale comprises selecting a relatively larger scale if the speed of the mobile terminal is higher and selecting a smaller scale if the speed of the mobile terminal is smaller.

2. The method of claim 1, further comprising:

determining a current scale for the map;

determining if the stored map information contains enough map information to fill the display screen at the current scale;

in response to determining that the stored map information does not contain enough map information to fill the display screen at the current scale, reducing the scale of the display screen until the stored map information is sufficient to fill the display screen at the reduced scale.

3. The method of claim 2, further comprising retrieving additional map information using the communication module sufficient to fill the display screen at the current scale, and after the additional map information has been retrieved, increasing the scale to the current scale.

4. The method of claim 1, further comprising estimating a current speed and direction of travel of the mobile terminal and estimating, in response to the current speed and direction of travel of the mobile terminal, when the mobile terminal will leave an area described by the stored map information.

5. The method of claim 4, further comprising:
estimating an amount of time needed to download additional map information for a geographic area that the mobile terminal is heading toward, and downloading the additional map information before the mobile terminal leaves the area described by the stored map information.

6. The method of claim 1, wherein estimating the current position of the mobile terminal is performed by a remote server in response to network-generated location information.

7. The method of claim 6, further comprising transmitting additional map information to the mobile terminal from the remote server if the current position of the mobile terminal is not within the boundary of the stored geographic map information.

8. The method of claim 1, wherein displaying the map including the current position of the mobile terminal on the display comprises displaying the map including the current position of the mobile terminal on the display after a predetermined period of nonuse of the mobile terminal.

9. The method of claim 8, wherein the mobile terminal further comprises a secondary display screen on a flip portion that is movable between an open position and a closed position so that the secondary display screen is visible when the flip portion is in the closed position, the method comprising displaying the map including the current position of the mobile terminal on the secondary display when the flip portion is in the closed position.

10. The method of claim 1, further comprising:
determining that the mobile terminal has entered an idle mode; and
reducing a brightness of the display and/or turning the display off;
wherein estimating the current geographic position of the mobile terminal and determining if the estimated current position of the mobile terminal is within the boundary of geographic map information stored in the mobile terminal are performed while the mobile terminal is in the idle mode.

11. The method of claim 10, wherein providing additional geographic map information to the mobile terminal using the communication module is performed while the mobile terminal is in the idle mode.

12. A mobile terminal, comprising:
a communication module;
a display screen; and
circuitry configured to estimate a current geographic position of the mobile terminal; to determine if the estimated current position of the mobile terminal is within a boundary of geographic map information stored in the mobile terminal, the geographic map information defining geographic features within a first geographic area; to display the map including the current position of the mobile terminal on the display in response to determining that the estimated current position of the mobile terminal is within the boundary of the stored geographic map information; and to retrieve additional geographic map information using the communication module in response to determining that the estimated current position of the mobile terminal is not within the boundary of the stored geographic map information, the additional geographic map information defining geographic features within a second geographic area that includes the estimated current position of the mobile terminal;
wherein the circuitry is further configured to determine a current scale for the map on the display screen by estimating a current speed of the mobile terminal and to automatically select a display scale in response to the current speed of the mobile terminal.

13. The mobile terminal of claim 12, wherein the circuitry is further configured to determine a current scale for the map; to determine if the stored map information contains enough map information to fill the display screen at the current scale; and to reduce the scale of the display screen until the stored map information is sufficient to fill the display screen at the reduced scale in response to determining that the stored map information does not contain enough map information to fill the display screen at the current scale.

14. The mobile terminal of claim 13, wherein the circuitry is further configured to retrieve additional map information using the communication module, and to increase the scale to an increased scale that is larger than the reduced scale after the additional map information has been retrieved.

15. The mobile terminal of claim 12, wherein the circuitry is further configured to estimate a current speed and direction of travel of the mobile terminal, and, in response to the current speed and direction of travel of the mobile terminal, to estimate when the mobile terminal will leave an area described by the stored map information.

16. The mobile terminal of claim 15, wherein the circuitry is further configured to
estimate an amount of time needed to download additional map information for a geographic area that the mobile terminal is heading toward, and to download the additional map information before the mobile terminal leaves the area described by the stored map information.

17. A map server, comprising:
a communication module configured to communicate with a remotely located mobile terminal;
a position/velocity determination unit configured to estimate position/velocity information for the mobile terminal;
a database storing map information; and
circuitry configured to determine if the estimated current position of the mobile terminal is within a boundary of geographic map information stored in the mobile terminal, the geographic map information defining geographic features within a first geographic area; and to send additional geographic map information from the database using the communication module in response to determining that the estimated current position of the mobile terminal is not within the boundary of the stored geographic map information, the additional geographic map information defining geographic features within a second geographic area that includes the estimated current position of the mobile terminal;
wherein the circuitry is further configured to determine a current scale for a map on a display screen of the mobile terminal by estimating a current speed of the mobile terminal and to automatically select a display scale for the map in response to the current speed of the mobile terminal.

18. The map server of claim 17, wherein the position/velocity determination unit is configured to estimate the current position of the mobile terminal using location information provided by a communication network in which the mobile terminal is registered.

19. The map server of claim 17, wherein the circuitry is further configured to estimate when the mobile terminal will leave an area described by the map information stored at the mobile terminal using the position/velocity of the mobile terminal, to estimate an amount of time needed to download additional map information for a geographic area that the mobile terminal is heading toward, and to transmit the additional map information to the mobile terminal before the mobile terminal leaves the area described by the map information stored at the mobile terminal.

* * * * *